E. S. TURNER.
Hedge-Hooks.
No. 139,215. Patented May 20, 1873.
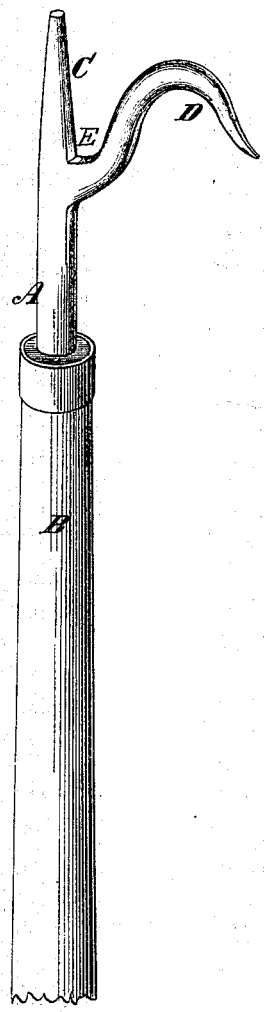
Witnesses.
A. Ruppert
O. W. Harkness
Inventor.
Edward S. Turner
by his attorney
Cox & Cox

UNITED STATES PATENT OFFICE.

EDWARD S. TURNER, OF PALMYRA, MISSOURI.

IMPROVEMENT IN HEDGE-HOOKS.

Specification forming part of Letters Patent No. 139,215, dated May 20, 1873; application filed December 21, 1872.

*To all whom it may concern:*

Be it known that I, EDWARD S. TURNER, of Palmyra, in the county of Marion and State of Missouri, have made certain new and useful Improvements in Hedge-Hooks, of which the following is a specification, reference being had to the accompanying drawing.

Nature and Objects of the Invention.

The invention relates to a shaft of iron, or other suitable material, provided with a prong having a hook on its end, between which hook and the shaft is a recess or fork. The object of the invention is to provide a convenient instrument for the purpose of bending and braiding or twisting hedge.

Description of the Accompanying Drawing.

A in the accompanying drawing is a shaft or bar of metal, or other suitable material, rigidly and firmly secured in the end of the handle B, and provided with the prong C, the outer end of which is formed into a hook, D, which is bent toward the handle B, its point having a proper outward inclination. The prong C is welded, or otherwise firmly secured to the shaft A, in such manner that the lateral planes of the centers of shaft and prong coincide. That portion of the prong C between the base of the hook D and the point where the prong is attached to the shaft A, is slightly concave, so that a fork, E, is formed between the curve of the hook nearest the shaft and the shaft itself, the end of which projects beyond the outer convexity of the hook.

The purposes of the invention are as follows: First, to bend down the hedge-plant, which is effected by catching the plant in the fork E aforesaid, and then forcing it in the direction desired; then, by inserting the shaft A in the ground, the plant may be retained in its depressed position. Second, the hook subserves the purpose of drawing the bent portion of the hedge-plant, when forced downward as aforesaid, through the space separating adjacent plants, and thus braiding the hedge.

Claim.

What I claim as my invention, and desire to secure by Letters Patent, is—

The hedge-hook herein described, provided with the fork E, as a new article of manufacture.

In testimony that I claim the foregoing improvements in hedge-hooks as above described, I have hereunto set my hand and seal this 26th day of October, 1872.

EDWARD S. TURNER. [L. S.]

Witnesses:
WILLIAM McFADON,
W. H. KEATH.